US011890628B1

(12) United States Patent
Youdovin et al.

(10) Patent No.: US 11,890,628 B1
(45) Date of Patent: Feb. 6, 2024

(54) CONCENTRATED CLEANING POD, DISPENSER, AND RETAINING-EJECTING MECHANISM FOR DISPENSING CLEANING SOLUTION THEREFROM

(71) Applicant: Everybody Cleanup, P.B.C., New York, NY (US)

(72) Inventors: David N. Youdovin, New York, NY (US); Karl Winkler, New York, NY (US); David Wolbert, New York, NY (US)

(73) Assignee: Everybody Cleanup, P.B.C., New York, NY (US)

(*) Notice: Subject to any disclaimer, the term of this patent is extended or adjusted under 35 U.S.C. 154(b) by 0 days.

(21) Appl. No.: 17/813,697

(22) Filed: Jul. 20, 2022

(51) Int. Cl.
*B65D 83/00* (2006.01)
*B05B 11/10* (2023.01)

(52) U.S. Cl.
CPC ....... *B05B 11/1081* (2023.01); *B05B 11/1011* (2023.01); *B05B 11/1042* (2023.01); *B05B 11/1057* (2023.01)

(58) Field of Classification Search
CPC ............. B05B 11/3081; B05B 11/3011; B05B 11/3042; B05B 11/3057; B65D 77/06
See application file for complete search history.

(56) References Cited

U.S. PATENT DOCUMENTS 610,127 A * 8/1898 Durafort .............. B67D 1/0412
222/399
2,172,035 A * 9/1939 Roth ................. B01F 23/23611
261/DIG. 7
2,822,002 A * 2/1958 Mack ..................... B65D 83/64
222/399
3,937,367 A * 2/1976 Hood .................... B05B 9/0833
222/399
4,174,056 A * 11/1979 Loeffler .............. B05B 11/3011
222/321.9
4,473,174 A * 9/1984 Heuser ................. B67D 1/0885
215/311

(Continued)

FOREIGN PATENT DOCUMENTS

CH 620987 A5 * 12/1980
KR 10-2005-0094277 9/2005
WO WO 00/26107 5/2000

OTHER PUBLICATIONS

International Search Report and Written Opinion received for International Patent Application No. PCT/US2023/020198, dated Aug. 23, 2023, 12 pages.

*Primary Examiner* — Bob Zadeh
(74) *Attorney, Agent, or Firm* — ALSTON & BIRD LLP

(57) ABSTRACT

A dispenser comprising a cover housing, a base at least partially defining a reservoir configured for receiving and maintaining fluid therein, and a dispensing mechanism configured for selectively dispensing fluid from the reservoir is provided. The cover housing comprises a chamber comprising a recess configured for receiving a pod at least partially therein, and a retaining-ejecting mechanism. The retaining-ejecting mechanism enables the pod to be inserted into a retained position at least partially within the recess, retained in the retained position, and released from the retained position. The cover housing is configured to be coupled to the base so as to enclose the reservoir.

20 Claims, 16 Drawing Sheets

(56) References Cited

U.S. PATENT DOCUMENTS

| | | | | |
|---|---|---|---|---|
| 5,323,935 | A * | 6/1994 | Gosselin | B05B 11/3087 222/401 |
| 5,388,766 | A * | 2/1995 | Buisson | B05B 11/3014 222/321.2 |
| 5,964,377 | A * | 10/1999 | Demarest | B05B 11/103 222/145.5 |
| 6,155,459 | A | 12/2000 | Bunschoten et al. | |
| 6,244,469 | B1 * | 6/2001 | Knickerbocker | B05B 11/3059 222/153.14 |
| 6,253,961 | B1 * | 7/2001 | Anderson | B05B 11/3002 222/321.7 |
| 7,040,510 | B1 * | 5/2006 | Hester | B05B 11/3056 222/509 |
| 7,051,907 | B2 | 5/2006 | Brincat | |
| 9,987,645 | B2 * | 6/2018 | Richman | B05B 15/30 |
| 10,682,658 | B1 * | 6/2020 | Youdovin | B08B 3/026 |
| 10,766,045 | B1 | 9/2020 | Youdovin | |
| 10,925,458 | B2 | 2/2021 | Youdovin | |
| 11,359,952 | B2 * | 6/2022 | Youdovin | B65D 85/804 |
| 2006/0196885 | A1 * | 9/2006 | Leach | B05B 11/3011 222/211 |
| 2007/0246569 | A1 | 10/2007 | Tada | |
| 2008/0314928 | A1 * | 12/2008 | Banco | B05B 11/3084 222/145.5 |
| 2009/0101680 | A1 * | 4/2009 | Laws | B65D 83/226 222/400.7 |
| 2011/0049193 | A1 * | 3/2011 | Muller Kubold | B67D 1/0412 222/399 |
| 2015/0336785 | A1 * | 11/2015 | Rege | B67D 1/1438 222/399 |
| 2017/0267510 | A1 * | 9/2017 | Chapman | B67D 1/1438 |
| 2020/0094287 | A1 * | 3/2020 | Loza | B05B 7/0408 |

* cited by examiner

CONCENTRATED CLEANING POD, DISPENSER, AND RETAINING-EJECTING MECHANISM FOR DISPENSING CLEANING SOLUTION THEREFROM

TECHNICAL FIELD

Various embodiments generally relate to a dispenser for dispensing solutions, such as cleaning solutions. For example, various embodiments relate to dispensers that decrease financial and carbon footprint costs of cleaning products.

BACKGROUND

In general, a user may wish to have various cleaning solutions for cleaning different surfaces. For example, a user may wish to have a glass cleaning solution, a bath cleaning solution, a general-purpose kitchen cleaning solution, a metal cleaning solution, and/or the like. However, traditional cleaning arrangements require users to maintain and store separate reservoirs of cleaning solution corresponding to each desired cleaning solution. The user may not want or be able to dedicate enough safe storage space to accommodate a plurality of different reservoirs of cleaning solutions.

Moreover, traditional cleaning arrangements require that a user purchase a dispenser each time the user wishes to refill a cleaning product. This increases the financial and carbon footprint costs of cleaning products.

BRIEF SUMMARY

Example embodiments of the present invention provide concentrated cleaning pods configured to store concentrated cleaning mediums and a dispenser for dispensing the concentrated cleaning mediums therefrom. Example embodiments of the present invention allow a user to have multiple types of cleaning mediums, without requiring the user to have multiple dispensers. In various embodiments, the dispenser may be an atomizer (e.g., spray bottle), a pump dispenser (e.g., hand pump), and/or the like. In various embodiments, the concentrated cleaning mediums may be a concentrated glass cleaning solution, bath cleaning solution, general purpose kitchen cleaning solution, metal cleaning solution, hand soap, dish soap, laundry stain remover, scent neutralizing solution, air freshener, laundry detergent, cleaning powders, and/or the like. Some example embodiments of the present invention provide a user with a single use amount of cleaning solution.

According to one aspect of the present invention, a dispenser for dispensing a cleaning medium from a pod is provided. In an example embodiment, the dispenser comprises a cover housing and a base. The cover housing comprises a pod chamber, a retaining-ejecting mechanism, a puncture tool, a dispensing mechanism, a trigger mechanism, an atomization area, a drain channel, and a holding area. The base comprises a reservoir portion configured for receiving and maintaining fluid therein. The cover housing is configured to be secured to the base via an integrated attachment mechanism. When the pod is positioned within the pod chamber, the cover housing is secured to the base, and the pod is punctured and retained in the pod chamber, the concentrated cleaning medium is provided to the reservoir portion through the drain channel. When the pod is positioned within the pod chamber, the cover housing is secured to the base, the pod is punctured and retained in the pod chamber, and the trigger is activated, the diluted and/or deconcentrated cleaning solution is dispensed from the reservoir portion through the dispensing mechanism and out of the nozzle.

In an example embodiment, the dispensing pipette extends from the holding area into the base. When the cover housing is secured to the base and the dispensing pipette is inserted into the body of the base (e.g., the reservoir portion), diluted and/or deconcentrated cleaning solution can be transferred and/or dispensed (e.g., in a stream, mist, pump, and/or the like) by activation (e.g., pulling, pushing, squeezing, pressing, and/or the like) of the trigger on the cover housing from the dispensing pipette to the nozzle. In an example embodiment, the trigger mechanism may be a rearward-facing trigger mechanism, allowing a user to actuate the trigger via thumb action and/or palm action.

In an example embodiment, the base comprises a reservoir portion configured to receive a dilution chemical configured to dilute the cleaning solution. The dilution chemical is dispensed from the reservoir portion of the base through the dispensing pipette and out of the nozzle with the cleaning solution. In an example embodiment, the dilution chemical comprises water (e.g., distilled water, ionized water, filtered water, and/or tap water).

In an example embodiment, the retaining-ejecting mechanism comprises a puncture tool configured to puncture a membrane location of the pod. In an example embodiment, the pod is configured to be inserted into the pod chamber and secured in the retaining-ejecting mechanism which enables the pod to be inserted into a retained position at least partially within the recess, retained in the retained position, and released from the retained position following designated user input. In an example embodiment, pressing the pod into the pod chamber causes the cleaning solution to be infused into the drain channel and secures the pod within the retaining-ejecting mechanism. For example, the puncture tool may be a hollow puncture pin that is coupled to the drain channel such that concentrated medium may flow through the to the drain channel. The concentrated medium may then flow through the drain channel into the reservoir portion.

In an example embodiment a dispenser comprises a cover housing and a base, wherein the cover housing is configured to be couple to the base so as to enclose the reservoir, wherein the cover housing comprises a dispensing mechanism configured for selectively dispensing fluid from a reservoir of the dispenser and a chamber, wherein the chamber comprises a recess configured for receiving a pod at least partially therein and a retaining-ejecting mechanism, wherein the retaining-ejecting mechanism enables the pod to be inserted into a retained position at least partially within the recess, retained in the retained position, and released from the retained position.

DETAILED DESCRIPTION

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. The term "or" (also denoted "/") is used herein in both the alternative and conjunctive sense, unless otherwise indicated. The terms "illustrative" and "exemplary" are used to be examples with no indication of quality level. The terms "generally" and "approximately" refer to within engineering and/or manufacturing limits and/or within user measurement capabilities, unless otherwise indicated. Like number refer to like elements throughout.

Figure 1:
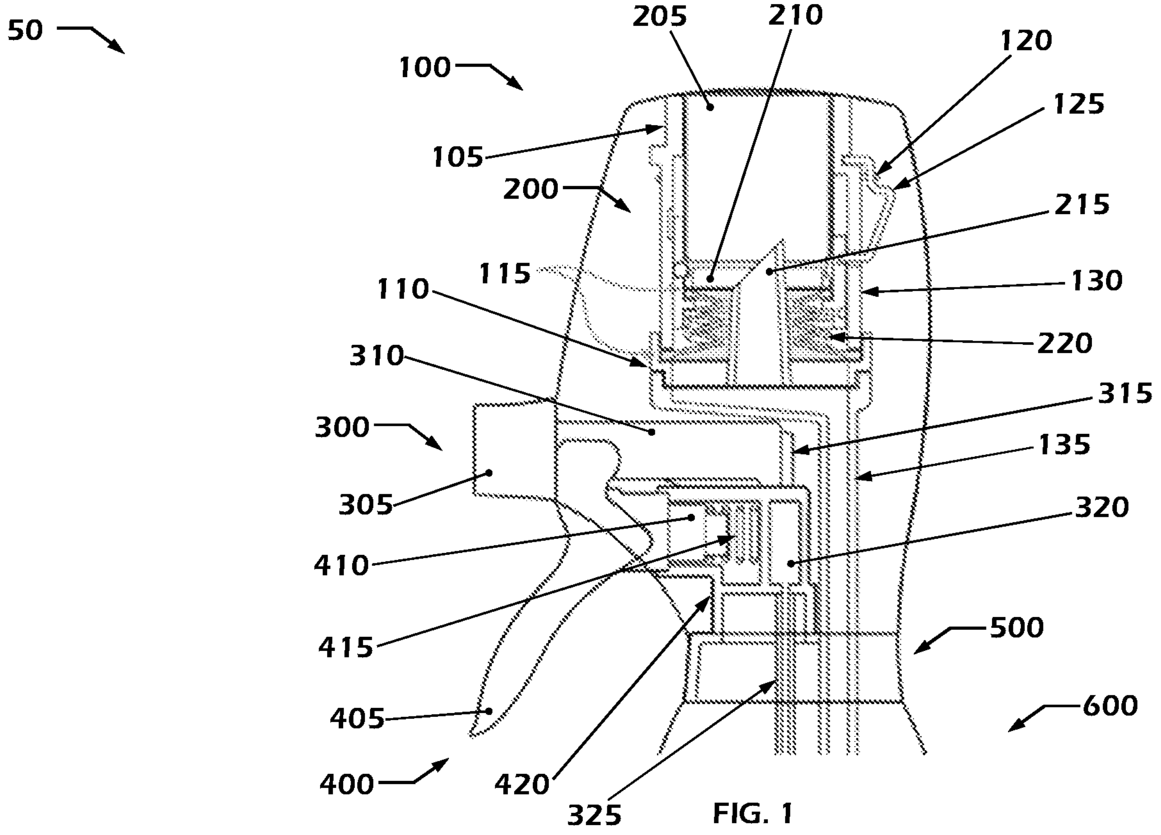
FIG. 1 illustrates a partial cross-sectional side view of a dispenser in accordance with an example embodiment.
Figure 2:
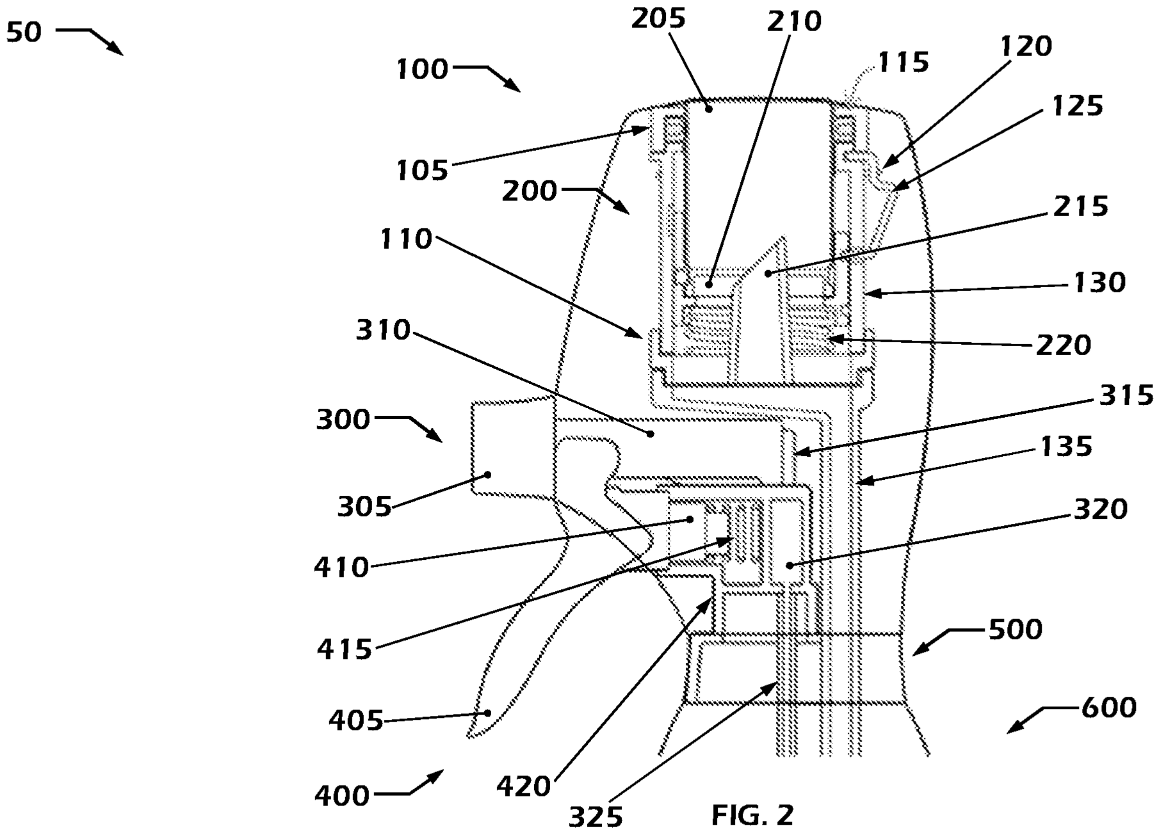
FIG. 2 illustrates a partial cross-sectional side view of a dispenser in accordance with an example embodiment.

FIG. 1 and FIG. 2, each provide a partial cross-sectional side view of a respective dispenser 50, according to various embodiments. In various embodiments, a dispenser 50 comprises: a cover housing 100 which is selectively affixed and/or securable to a base 600 via at least one attachment mechanism 500. The at least one attachment mechanism 500 may be designed in a number of different configurations (e.g., threaded, push latch, snap fit, magnetic, etc.). The base 600 at least partially defines a reservoir configured for receiving and maintaining fluid therein.

The cover housing 100 is configured to be coupled to the base via the at least one attachment mechanism 500 so as to enclose the reservoir. The cover housing 100 structure includes a chamber 130, providing a recess configured for receiving a pod 205 at least partially therein. The cover housing 100 also includes a retaining-ejecting mechanism 200 corresponding to and/or coupled to the recess chamber 130. The retaining-ejecting mechanism 200 enables the pod 205 to be inserted into a retained position at least partially within the recess, retained in the retained position, and released from the retained position following designated user input. The pod 205 may be configured to contain a desired dosage of concentrated powder or fluid.

In various embodiments, a retaining-ejecting mechanism 200 may be incorporated into various dispensers. For example, a retaining-ejecting mechanism 200 may be incorporated into dispensers similar to those disclosed by U.S. Pat. No. 10,682,658, issued Jun. 16, 2020, U.S. Pat. No. 10,766,045, issued Sep. 8, 2020, U.S. Pat. No. 11,359,952, issued Jun. 14, 2022, a floor cleaner similar to that disclosed by U.S. Pat. No. 10,925,458, issued Feb. 23, 2021, and/or other dispensers and/or cleaning devices. The contents of the noted patents are incorporated herein by reference in their entireties. For example, a retaining-ejecting mechanism 200 may be incorporated into the housing of various types of dispensers and/or cleaning devices such that the retaining-ejecting mechanism 200 may be used to receive a pod 205 containing a concentrated cleaning medium and cause the concentrated cleaning medium to be provided to a reservoir of the dispenser and/or cleaning device for dilution and/or use.

Example Cover Housing

In an example embodiment, the cover housing 100 comprises a chamber 130. The chamber 130 comprises a recess, wherein the recess is configured to receive a pod 205 therein. The recess is defined by a lower chamber wall 110 and at least one side wall.

In an example embodiment, the chamber 130 recess is defined, at least in part, by a lower chamber wall 110. The depth of lower chamber wall 110 from at least one surface of the cover housing is within a desired tolerance of the length of the pod 205.

Figure 6:
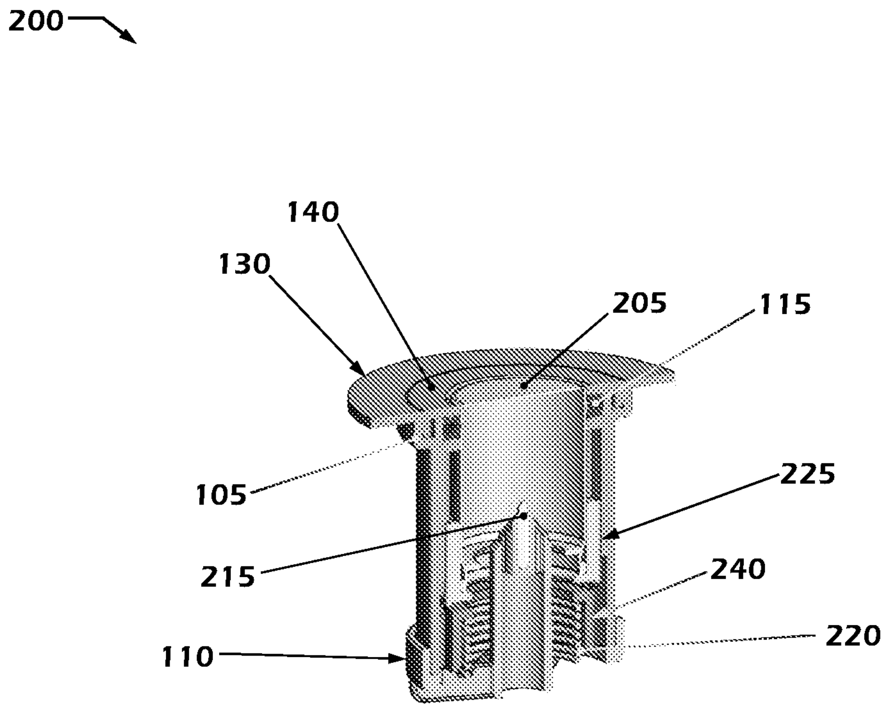
FIG. 6 illustrates a detailed cross-sectional isometric view of the retaining-ejecting mechanism in accordance with an example embodiment where the cleaning pod is pushed into the retained position of the retaining-ejecting mechanism.

In an example embodiment, the chamber 130 comprises at least one side wall and the lower chamber wall 110. The height of the at least one side wall is configured such that when the pod 205 is in the retained position, a surface of the pod 205 is generally flush with a surface of the cover housing 100 (as shown in FIG. 6).

Example Cleaning Pod

In an example embodiment, the pod 205 is configured with at least three sides to form an internal volume. The internal volume is filled with a concentrated cleaning medium, designed to be released into a fluid to be deconcentrated and/or diluted. To do so, a puncture location 210 is configured in the design of the pod 205. The puncture location 210 may be designed in a number of different configurations (metallic foil, elastomeric polymer membrane, etc.) to provide puncturing of the pod 205 after being depressed into the retaining-ejecting mechanism 200. A puncture tool 215 is located at the lower chamber wall 110 in an orientation configured to puncture a portion of the pod 205. The puncture tool 215 may be designed in a number of different configurations (e.g., needle, sharp, blunt, or tapered edge, etc.).

Exemplary Puncture Tool

In an example embodiment, a puncture tool 215 is integrated within the design of the lower chamber wall 110.

In an example embodiment, a puncture tool 215 is attached separately to the structure of the lower chamber wall 110.

In various embodiments, the puncture tool 215 is configured to puncture a surface of a pod 205 that is being inserted into the retained position within the chamber 130. In an example embodiment, the puncture tool 215 is at least partially hollow such that fluid from within the pod 205 may flow through at least a portion of the puncture tool 215 to flow into the dispenser reservoir.

Example Fluid Seal

The pod 205 may be configured with a puncture location 210 to release the contained concentrated powder or fluid. The puncture location 210 may be designed in a number of different configurations (e.g., metallic foil, elastomeric polymer membrane, etc.) to provide puncturing of the pod 205 after and/or as part of being pressed into the chamber 130 and being engaged into the retained position by the retaining-ejecting mechanism 200. A puncture tool 215 is located at the lower chamber wall 110 in an orientation configured to puncture a portion of the pod 205. The puncture tool 215 may be designed in a number of different configurations (e.g., needle, sharp, blunt, or tapered edge, etc.). In this design example, it can also be noted that the puncture tool 215 may be integrated within the design of the lower chamber wall 110 or attached separately therein.

In an example embodiment, at least one mechanical connection between the chamber 130 and the pod 205 is lined with a fluid seal 115. The seal functionally prevents fluid from passing in or out of the dispenser 50 reservoir.

In an example embodiment, a chamber wall 105 is integrated within the structure of the cover housing 100 to support the fluid seal 115 in a fixed location. This chamber wall 105 is coupled with a seal barrier 140 that contains the fluid seal 115 in the fixed location in the scenario the chamber wall 105 structure is open to the top of the chamber 130. The seal barrier 140 also provides a direct contact patch between the connection of the chamber 130 and the pod 205 to ensure an adequate seal is provided.

In an example embodiment, the seal 115 is a bellows seal, an example of which is illustrated in FIG. 1. In an example embodiment, the seal 115 is an O-ring or gasket seal configured to engage with the walls of a pod 205, as shown in FIG. 2.

Example Retaining-Ejecting Mechanism

In an example embodiment, a retaining-ejecting mechanism 200 comprises at least one spring 220, an insert guide 225, a clip 125, a retainer 120, and a roller stop 230. The retaining-ejecting mechanism 200 enables the pod 205 to be inserted into a retained position at least partially within the recess, retained in the retained position, and released from the retained position following designated user input.

In an example embodiment, a retaining-ejecting mechanism 200 comprises at least one spring 220, an insert guide 225, and a spring retainer 240. The retaining-ejecting mechanism 200 enables the pod 205 to be inserted into a retained position at least partially within the recess, retained in the retained position, and released from the retained position. In an example embodiment, the clip 125 is configured such at least one protrusion of the clip 125 fits into at least one cavity in the insert guide 225 and at least one cavity in the structure of the chamber 130 wall. The retainer 120 retains the position of the clip 125 and position of the insert guide 225, wherein the position of the insert guide 225 provides a known location of at least an empty position, loaded position, punctured position, retained position, and released position. The retainer 120 may be removed and/or relocated to allow movement of the clip 125 from the insert guide 225, wherein the insert guide 225 may be translated unidirectionally between one or more positions of the plurality of known locations.

Example Dispenser Mechanism

In an example embodiment, a dispensing mechanism 300 comprises, a nozzle 305, an atomization area 310, a flow channel 315, a holding area 320, and a dispensing pipette 325. The dispensing mechanism 300 directs flow of the cleaning solution from the base 600 reservoir out of the nozzle 305.

Example Trigger Mechanism

In an example embodiment, a trigger mechanism comprises, a trigger handle 405, a plunger mechanism 410, a trigger spring 415, and a trigger structure 420. The trigger mechanism 400 generates a force (e.g., pressure differential, vacuum, or the like) to pull the cleaning solution into a holding area 320 upon release of the trigger handle 405 and an opposing force to dispense the cleaning solution from the holding area 320 when the trigger handle 405 in pressed. The releasing of the trigger handle 405 primes the holding area 320 with cleaning solution for the next activation of the trigger handle 405. A trigger spring 415 provides a constant tension or compression force against the plunger mechanism 410 in mechanical connection to the trigger. The trigger mechanism 400 is supported by the trigger structure 420, which may also be configured within the design of the cover housing 100.

Example Drain Channel

In an example embodiment, A lower chamber wall 110 exists at the bottommost surface of the chamber 130. Beneath the lower chamber wall 110, at least one drain channel 135 exists to direct flow of the pod 205 medium into the base 600 reservoir to be mixed as a cleaning solution.

In an example embodiment, the drain channel is part of the puncture tool 215. For example, the puncture tool 215 may be at least partially hollow such that pod medium may flow through the hollow portion of the puncture tool 215 from the interior of the pod 205 into the base reservoir.

In an example embodiment, the drain channel is a pipette or other opening in the lower chamber wall 110 configured to enable pod medium exiting the pod 205 that was punctured by the puncture tool 215 to flow into the base reservoir.

Example Dispenser Functionality

In an example embodiment, a pod 205 containing a concentrated cleaning medium is inserted into the pod chamber 130 of the cover housing 100. The pod 205 is then pressed into the retained position of the retaining-ejecting mechanism 200 by the user to retain the pod 205 in the cover housing 100, and thus releasing the concentrated cleaning medium from the pod 205 into the base 600 reservoir. Next, the dispenser 50 is shaken to deconcentrate and/or dilute the concentrated cleaning medium with the contents of the base 600 reservoir. The trigger mechanism 400 can then be activated to dispense the deconcentrated and/or dilute cleaning solution from the base 600 reservoir and out of the dispensing mechanism 300. After the dosage of contents of the base 600 reservoir have been expelled for the cleaning operation, the pod 205 can be removed and properly disposed. Finally, the dispenser 50 cover housing 100 and base 600 reservoir can be rinsed before storing for the next use.

Additional Example Embodiments

In an example embodiment of FIG. 1, the dispenser comprises a cover housing, a retaining-ejecting mechanism, a dispensing mechanism, a trigger mechanism, an attachment mechanism, and a base. A concentrated cleaning pod 205 is inserted into the chamber 130 of the cover housing 130 and depressed into the retained position of the retaining-ejecting mechanism 200. The puncture tool 215 is protruding into the puncture membrane at the puncture location 210 of the pod 205. The fluid seal 115 is a bellows seal. The fluid seal 115 prevents fluid from leaking in and/or out of the base 600 reservoir. The concentrated cleaning medium is transferred from the pod 205 to the base 600 reservoir via at least one drain channel 135.

In an example embodiment of FIG. 2, the dispenser comprises a cover housing, a retaining-ejecting mechanism, a dispensing mechanism, a trigger mechanism, an attachment mechanism, and a base. A concentrated cleaning pod 205 is inserted into the chamber 130 of the cover housing 130 and depressed into the retained position of the retaining-ejecting mechanism 200. The puncture tool 215 is protruding into the puncture membrane at the puncture location 210 of the pod 205. The fluid seal 115 is a wipe seal. The fluid seal 115 prevents fluid from leaking in and/or out of the base 600 reservoir. The concentrated cleaning medium is transferred from the pod 205 to the base 600 reservoir via at least one drain channel 135.

In various embodiments, the cover housing 100 further comprises a dispensing mechanism 300. The dispensing mechanism 300 may be designed in a number of different configurations (e.g., atomizer, pump dispenser, and the like). An atomization area 310 may be configured in the design of the cover housing 100 to provide a desired air to cleaning solution ratio or normal flow to a spout in an embodiment where the dispensing mechanism 300 is a pump dispenser. The nozzle 305 may be attached to the cover housing 100 via an outlet of the atomization area 310. The outlet may be designed in a number of different configurations (e.g., threaded tube, push latch, snap fit, etc.). The nozzle 305 may also be configured to provide different levels of projection or spray pattern of the cleaning solution as desired.

At the opposing end of the atomization area 310 from the nozzle 305, a flow channel 315 may provide a direction of flow of the cleaning solution from the base 600 reservoir to the dispensing mechanism 300. The cleaning solution may be extracted from the base 600 via a dispensing pipette 325 and trigger mechanism 400. The trigger mechanism 400 generates a force (e.g., pressure differential, vacuum, or the like) to pull the cleaning solution into a holding area 320 upon release of the trigger handle 405 and an opposing force to dispense the cleaning solution from the holding area 320 when the trigger handle 405 in pressed. The releasing of the trigger handle 405 primes the holding area 320 with cleaning solution for the next activation of the trigger handle 405. A trigger spring 415 provides a constant tension or compression force against the plunger mechanism 410 in mechanical connection to the trigger. The trigger mechanism 400 is supported by the trigger structure 420, which may also be configured within the design of the cover housing 100.

Figure 3:
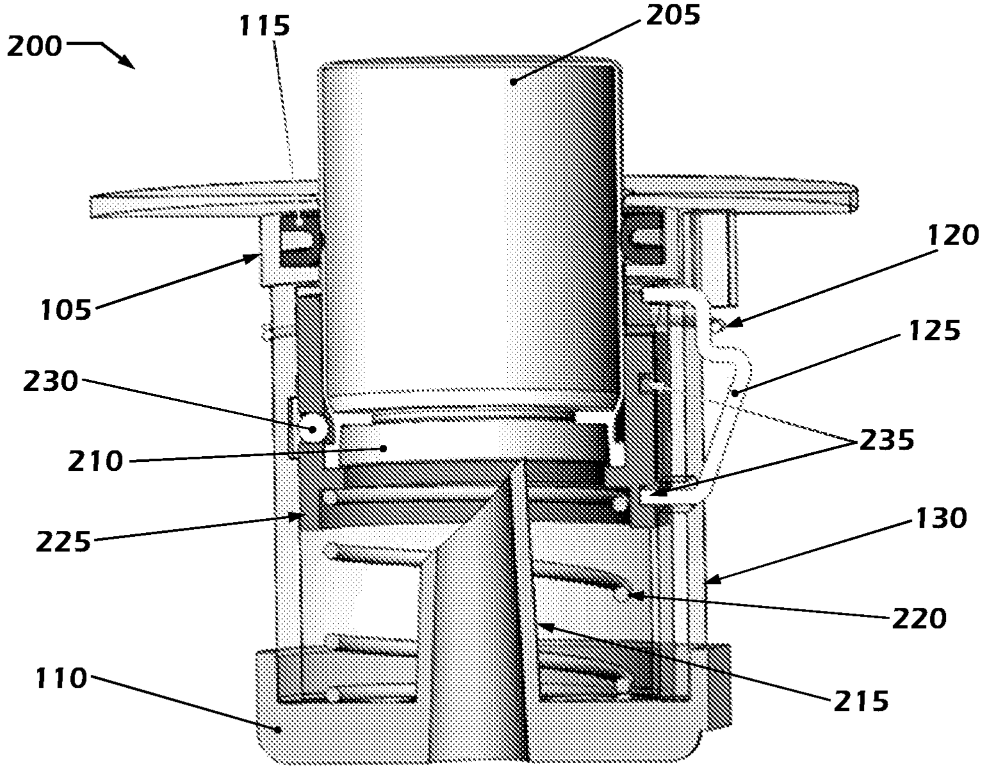
FIG. 3 illustrates a detailed and enlarged cross-sectional side view of the retaining-ejecting mechanism of the example embodiment shown in FIG. 2.

FIG. 3 provides a partial cross-sectional side view of the retaining-ejection mechanism of the example embodiment shown in FIG. 2 in a cross-sectional side view, according to various embodiments. In various embodiments, a dispenser 50 comprises the chamber 130 of the cover housing 100 to provide a recess configured for receiving a pod 205 at least partially therein. The pod 205 rests on the insert guide 225 within the chamber 130. The insert guide 225 may slide in a unidirectional path to direct the pod 205 in or out of the chamber 130. A spring 220 provides a tensile or compression force between the insert guide 225 and the lower chamber wall 110. A roller stop 230 prevents the spring 220 from over extending or over compressing the insert guide 225 in the chamber 130. At least one insert guide stop marker 235 may exist or be integrated within the design of the insert guide 225 to provide one or more known positions of the insert guide 225.

A clip 125 resides in one or more of the at least one insert guide stop marker 235, which implements the retaining-ejecting mechanism 200. The clip 125 may be moved outward by user input (e.g., direct contact, relocated mechanism, electromechanical button assembly, etc.) and thus away from the at least one insert guide stop marker 235 to allow movement of the insert guide 225. A retainer 120 applies constant force against the outward direction of the clip 125 to retain the insert guide 225 in at least one of the one or more known positions when motion is undesired.

The pod 205 may be configured with a puncture location 210 to release the contained concentrated powder or fluid. The puncture location 210 may be designed in a number of different configurations (e.g., metallic foil, elastomeric polymer membrane, etc.) to provide puncturing of the pod 205 after being depressed into the retaining-ejecting mechanism 200. A puncture tool 215 is located at the lower chamber wall 110 in an orientation configured to puncture a portion of the pod 205. The puncture tool 215 may be designed in a number of different configurations (e.g., needle, sharp, blunt, or tapered edge, etc.). In this design example, it can also be noted that the puncture tool 215 may be integrated within the design of the lower chamber wall 110 or attached separately therein. At least one fluid seal 115 is integrated within the chamber wall 105 to prevent spillage of the pod 205 or base 600 reservoir. The fluid seal 115 may be designed in a number of different configurations or combinations thereof (e.g., wipe seal, O-ring/gasket seal, bellows seal, etc.).

FIG. 4, FIG. 5, FIG. 6, and FIG. 7, each illustrate different steps in a cycle of receiving, retaining, and ejecting a pod 205 of the retaining-ejecting mechanism 200. In this example embodiment, a spring retainer 240 is included to provide the unidirectional motion of the insert guide 225 through the chamber 130. A seal barrier 140 is also included to provide a direct contact patch between the connection of the chamber 130 and the pod 205 to ensure an adequate seal is provided. This seal barrier 140 is useful in the scenario the chamber wall 105 structure is open to the top of the chamber 130.

Figure 4:
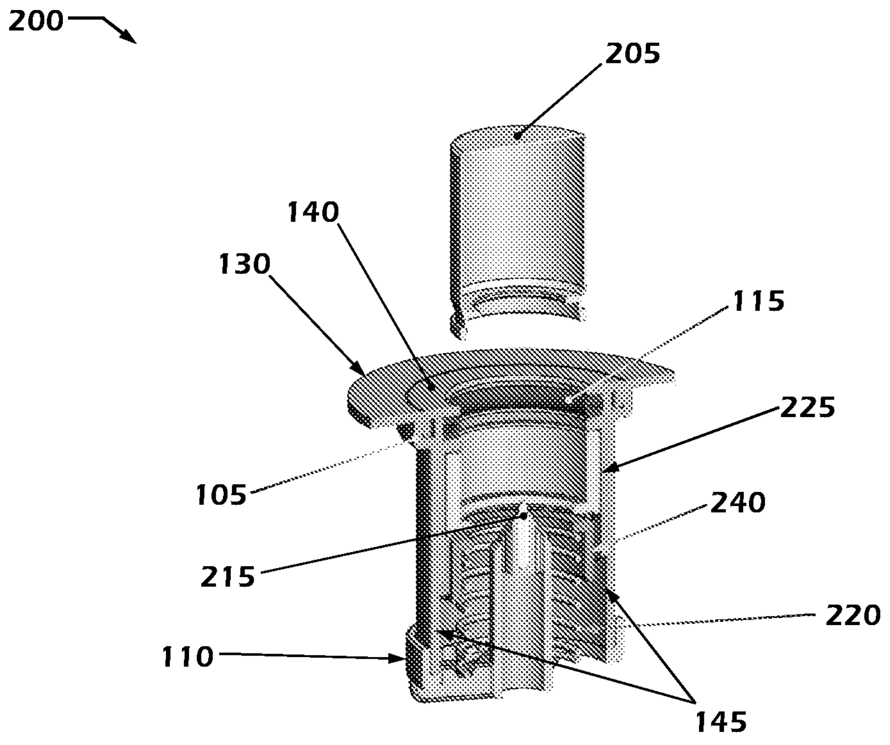
FIG. 4 illustrates a detailed cross-sectional isometric view of the retaining-ejecting mechanism in accordance with an example embodiment where the cleaning pod is removed from the chamber.
Figure 5:
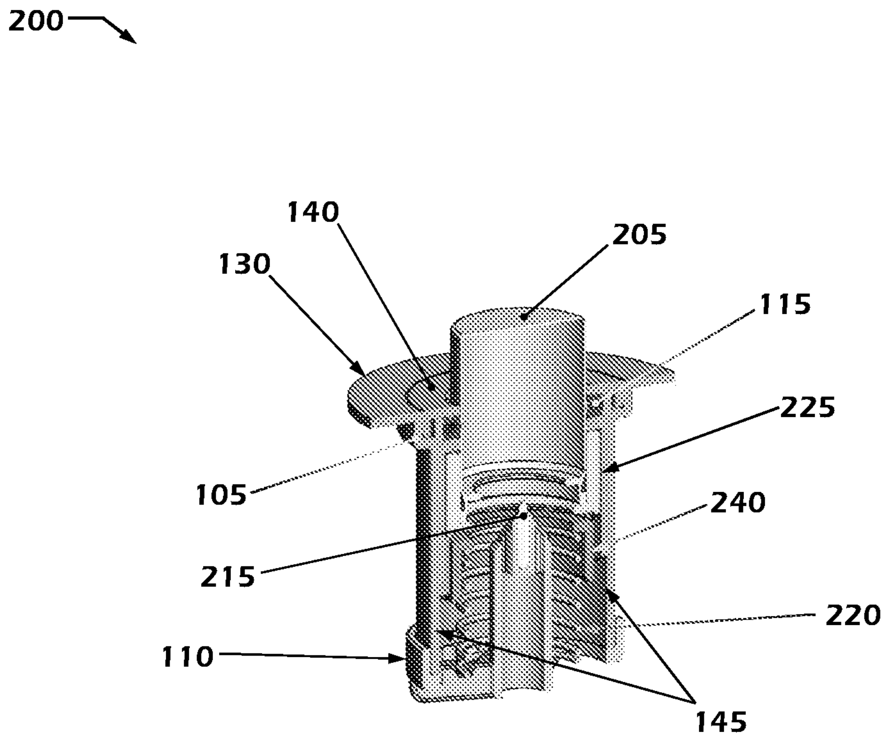
FIG. 5 illustrates a detailed cross-sectional isometric view of the retaining-ejecting mechanism in accordance with an example embodiment where the cleaning pod is inserted into the chamber.

In particular, FIG. 4 illustrates the configuration of an insert guide 225, spring retainer 240, and spring 220 when a cleaning pod 205 is not engaged therewith. FIG. 5 illustrates the cleaning pod 205 engaging with the insert guide 225 as the insert guide 225 begins to engage the spring retainer 240 to cause the compression of the spring 220 as the cleaning pod is pressed into the chamber 130.

FIG. 6 illustrates the configuration of the insert guide 225, spring retainer 240, and spring 220 when the cleaning pod 205 is in the retained position. For example, the insert guide 225 has engaged the spring retainer 240 to cause the spring retainer 240 to compress the spring 220 and to cause the spring retainer 240 to engage with an alcove or compartment in the lower portion of the chamber. The engagement of the spring retainer 240 with the alcove or compartment in the lower portion of the chamber prevents the compressed spring 220 from being able to push the spring retainer 240 back toward the unengaged position illustrated in FIGS. 4 and 5.

Figure 7:
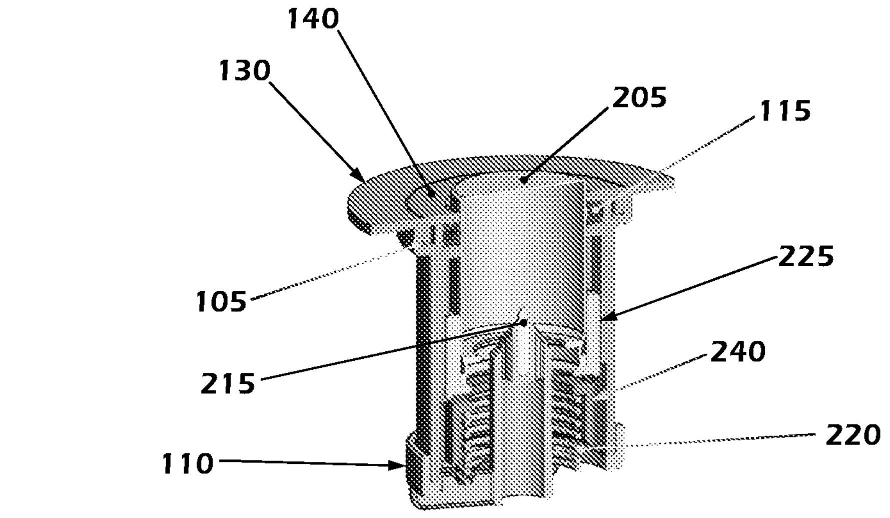
FIG. 7 illustrates a detailed cross-sectional isometric view of the retaining-ejecting mechanism in accordance with an example embodiment where the cleaning pod is retained within the retained position of the retaining-ejecting mechanism.

FIG. 7 illustrates the configuration of the insert guide 225, spring retainer 240, and spring 220 as the spring retainer 240 is released from engagement with the alcove or compartment in the lower portion of the chamber 130 such that the spring 220 is able to push the spring retainer 240 (and indirectly the insert guide 225 and pod 205) back toward their respective unengaged positions.

Figures 8A, 8B, 8C, 8D, 8E, 8F, 8G:
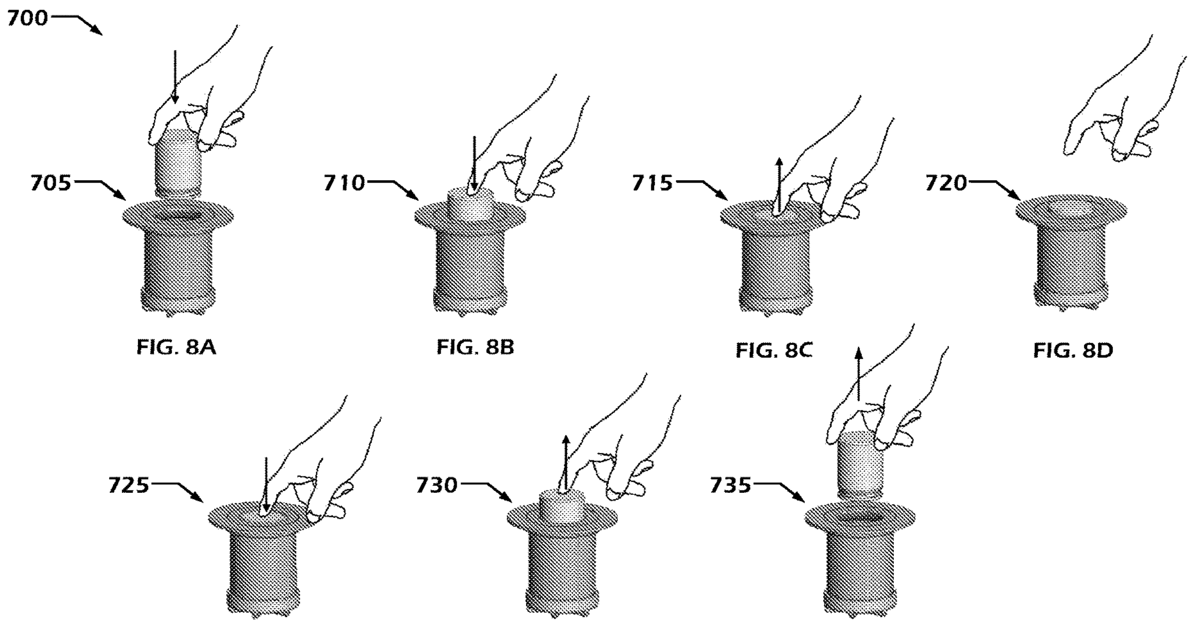
FIG. 8A illustrates a detailed isometric view of the input required to insert the cleaning pod into the chamber in accordance with an example embodiment.
FIG. 8B illustrates a detailed isometric view of the input required to insert the cleaning pod into the retaining-ejecting mechanism in accordance with an example embodiment.
FIG. 8C illustrates a detailed isometric view of the input required to press the cleaning pod into the retained position of the retaining-ejecting mechanism in accordance with an example embodiment.
FIG. 8D illustrates a detailed isometric view of the input required to retain the cleaning pod within the retained position of the retaining-ejecting mechanism in accordance with an example embodiment.
FIG. 8E illustrates a detailed isometric view of the input required to release the cleaning pod from the retained position of the retaining-ejecting mechanism in accordance with an example embodiment.
FIG. 8F illustrates a detailed isometric view of the input required to release the cleaning pod from the retaining-ejecting mechanism in accordance with an example embodiment.
FIG. 8G illustrates a detailed isometric view of the input required to release the cleaning pod from the chamber in accordance with an example embodiment.

The series of FIGS. 8A-8G, provides a method for inserting and removing 700 the pod 205 to and from the chamber 130 of the dispenser 50. FIG. 8A illustrates the input required to insert the cleaning pod 205 into the chamber 130 (step 705). FIG. 8B illustrates the input required to insert the cleaning pod 205 into the retaining-ejecting mechanism 200 (step 710). FIG. 8C illustrates the input required to press the cleaning pod 205 into the retained position of the retaining-ejecting mechanism 200 (step 715). FIG. 8D illustrates the input required to retain the cleaning pod 205 within the retained position of the retaining-ejecting mechanism 200 (step 720). FIG. 8E illustrates the input required to release the cleaning pod 205 from the retained position of the retaining-ejecting mechanism 200 (step 725). FIG. 8F illustrates the input required to release the cleaning pod 205 from the retaining-ejecting mechanism 200 (step 730). FIG. 8G illustrates the input required to release the cleaning pod 205 from the chamber 130 (step 735).

Figure 9:
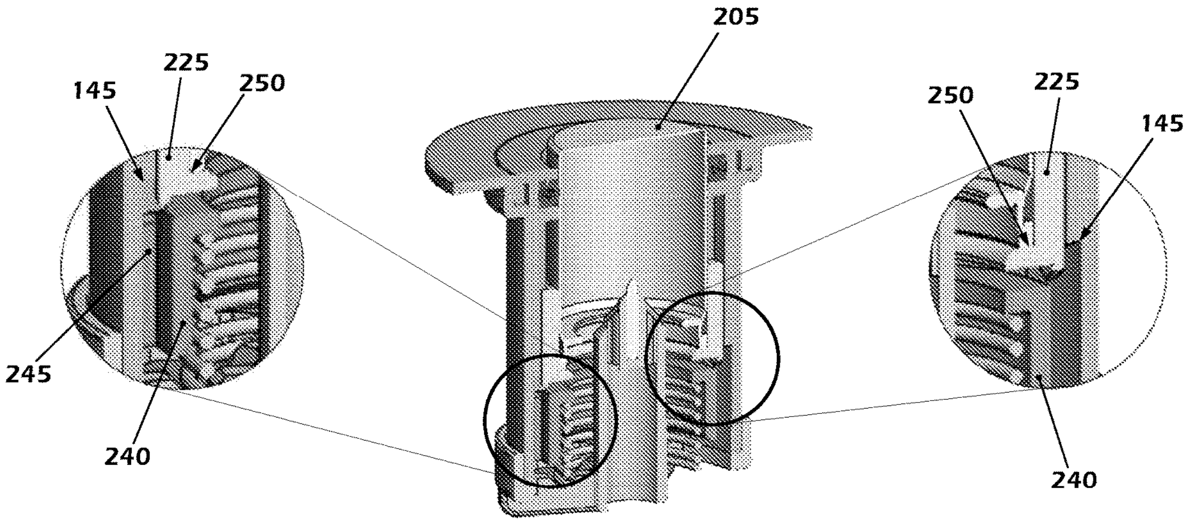
FIG. 9 illustrates an enlarged detailed cross-sectional isometric view of the retaining-ejecting mechanism highlighting design features in accordance with an example embodiment where the cleaning pod is retained within the retained position of the retaining-ejecting mechanism.

FIG. 9 provides an enlarged detailed cross-sectional isometric view of the retaining-ejecting mechanism 200 highlighting the portions of the insert guide 225, spring retainer 240, and larger alcove 145 in the lower chamber wall 110. In an example embodiment, as the cleaning pod 205 is pressed into the retaining-ejecting mechanism 200, the cleaning pod engages contact with the insert guide 225 at an engagement surface 250. This unidirectional motion forces the insert guide 225 into the spring retainer 240, such that the spring retainer 240 is also forced in the same unidirectional motion. The spring retainer 240 is designed such that a wider portion of the spring retainer 240 is pushed into a larger alcove 145 in the lower chamber wall 110. In an example embodiment, the spring retainer 240 is designed as a cam 245, wherein the cam 245 profile rotates following the unidirectional downward motion of the cleaning pod 205 as pressed into the retaining-ejecting mechanism 200. As the cleaning pod 205 is pressed into the retained position of the retaining-ejecting mechanism 200, the spring retainer 240 may rotate freely and is reset to the orientation of least spring resistance, wherein the orientation of least spring resistance is the same as the initial position of the spring retainer 240 at the empty and/or released position with respect to the axis of the unidirectional motion of the cleaning pod 205. As the cleaning pod 205 is pressed again after being retained in the retained position of the retaining-ejecting mechanism 200, the spring retained 240 is forced to rotate once again. The cam 245 profile of the spring retainer 240 causes the spring retainer to rotate out of the alcove of the lower chamber wall 110, thus returning to the initial empty and/or released position.

Figure 10A:
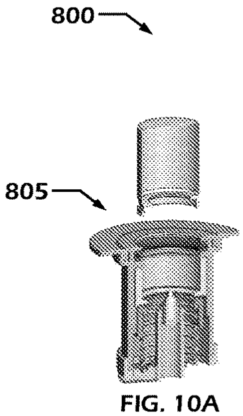
FIG. 10A illustrates a detailed cross-sectional isometric view of the retaining-ejecting mechanism with the cleaning pod removed from the chamber in accordance with the example embodiments shown in FIG. 8A and FIG. 8G.
Figure 10B:
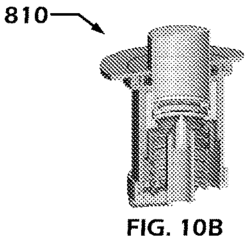
FIG. 10B illustrates a detailed cross-sectional isometric view of the retaining-ejecting mechanism with the cleaning pod in the chamber in accordance with the example embodiments shown in FIG. 8B and FIG. 8F.
Figure 10C:
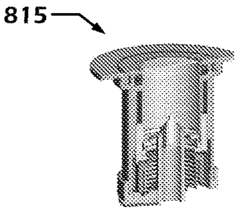
FIG. 10C illustrates a detailed cross-sectional isometric view of the retaining-ejecting mechanism with the cleaning pod in the retaining-ejecting mechanism in accordance with the example embodiments shown in FIG. 8C and FIG. 8E.
Figure 10D:
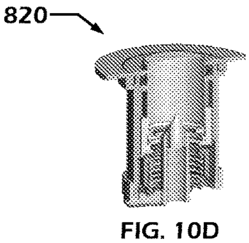
FIG. 10D illustrates a detailed cross-sectional isometric view of the retaining-ejecting mechanism with the cleaning pod in the retained position of the retaining-ejecting mechanism in accordance with the example embodiment shown in FIG. 8D.

The series of FIGS. 10A-10D provides a detailed cross-sectional isometric view of the retaining-ejecting mechanism 200 with the cleaning pod 205 illustrated as shown in the series of FIGS. 8A-8G of method 800. FIG. 10A illustrates the retaining-ejecting mechanism 200 with the cleaning pod 205 removed from the chamber 130 of FIG. 8A and of FIG. 8G (step 805). This also illustrates the orientation of the retaining-ejecting mechanism 200 at which the least spring resistance exists against the spring retainer 240 and thus the insert guide 225 in the opposing direction. FIG. 10B illustrates the retaining-ejecting mechanism 200 with the cleaning pod 205 inserted into the chamber 130 of FIG. 8B and of FIG. 8F (step 810). This also illustrates the orientation of the retaining-ejecting mechanism 200 at which a near-minimum spring resistance exists against the spring retainer 240 and thus the insert guide 225 in the opposing direction. FIG. 10C illustrates the retaining-ejecting mechanism 200 with the cleaning pod 205 pressed into the retaining-ejecting mechanism 200 of FIG. 8C and of FIG. 8E (step 815). This also illustrates the orientation of the retaining-ejecting mechanism 200 at which the maximum spring resistance exists against the spring retainer 240 and thus the insert guide 225 in the opposing direction. FIG. 10D illustrates the retaining-ejecting mechanism 200 with the cleaning pod 205 retained within the retained position of the retaining-ejecting mechanism 200 of FIG. 8D (step 820). This also illustrates the orientation of the retaining-ejecting mechanism 200 at which a near-maximum spring resistance exists against the spring retainer 240 and thus the insert guide 225 in the opposing direction.

Figure 11:
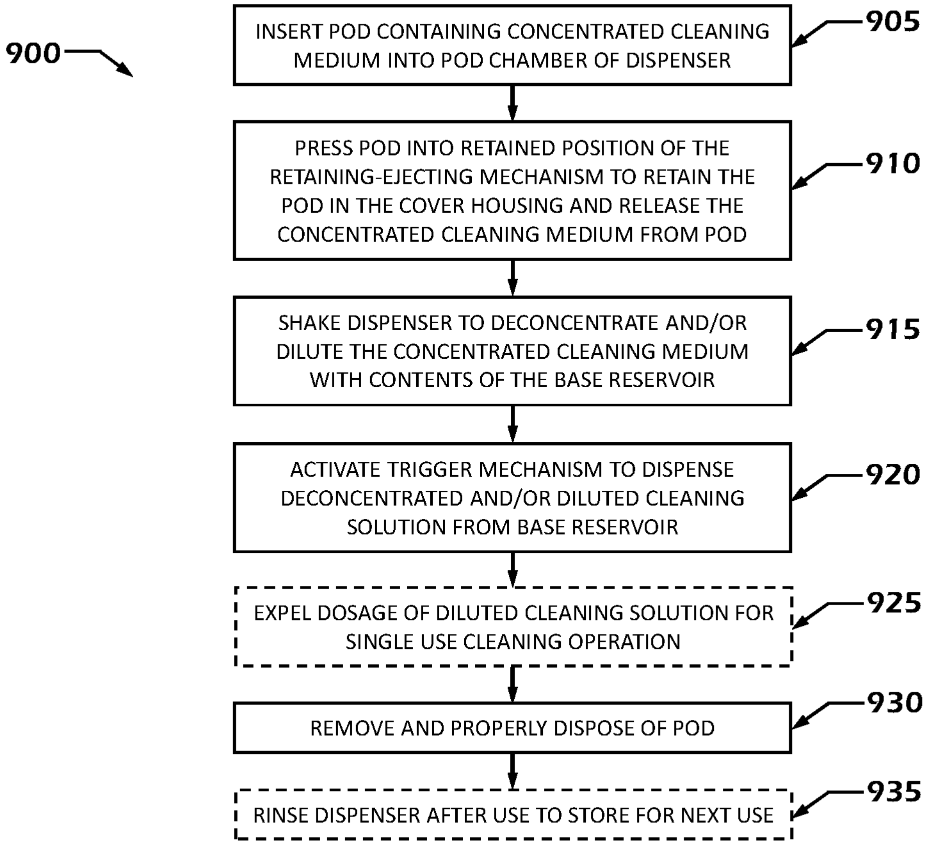
FIG. 11 provides a flowchart illustrating various processes for using a dispenser and cleaning pod in accordance with example embodiments.

FIG. 11 provides a flowchart of the use methodology 900 for the dispenser 50. At the first block 905, a pod 205 containing a concentrated cleaning medium is inserted into the pod chamber 130 of the cover housing 100. At the second block 910, the pod 205 is pressed into the retained position of the retaining-ejecting mechanism 200 by the user to retain the pod 205 in the cover housing 100, and thus releasing the concentrated cleaning medium from the pod 205 into the base 600 reservoir. At the third block 915, the dispenser 50 is shaken to deconcentrate and/or dilute the concentrated cleaning medium with the contents of the base 600 reservoir.

At the fourth block 920, the trigger mechanism 400 can be activated to dispense the deconcentrated and/or dilute cleaning solution from the base 600 reservoir and out of the dispensing mechanism 300. At the fifth block 925, the dosage of contents of the base 600 reservoir have been expelled for the cleaning operation. At the sixth block 930, the pod 205 can be removed and properly disposed. At the final block 935, the dispenser 50 cover housing 100 and base 600 reservoir can be rinsed before storing for the next use.

Figure 12B:
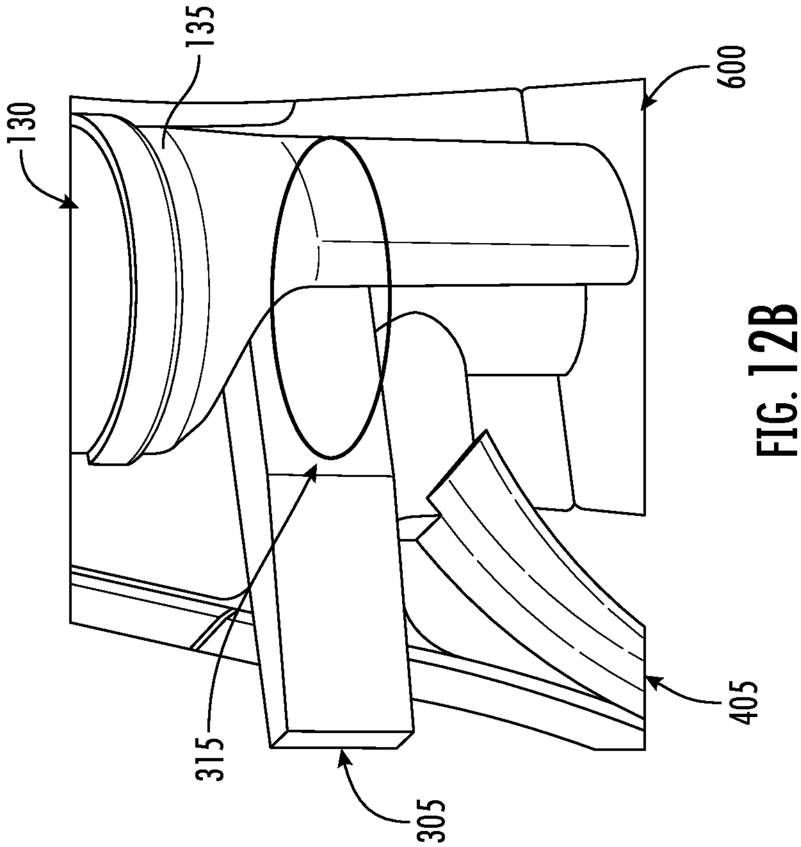
FIG. 12B illustrates a detailed isometric view highlighting the dispensing mechanism and the trigger mechanism in accordance with example embodiments.
Figure 12A:
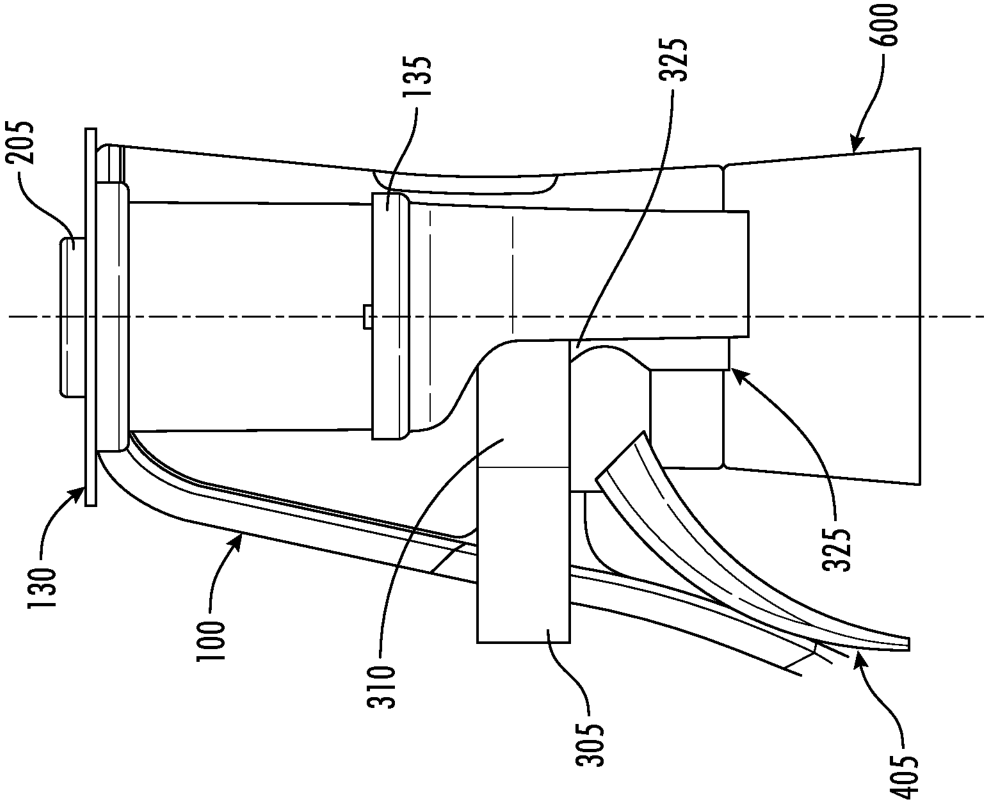
FIG. 12A illustrates a detailed side view highlighting the retaining-ejecting mechanism, dispensing mechanism, and the trigger mechanism in accordance with example embodiments.

The series of FIGS. 12A-12B provides a detailed view of the retaining-ejecting mechanism 200, dispensing mechanism 300, and trigger mechanism 400. In an example embodiment, the at least one drain channel 135 may be configured to reside within a protective cover to prevent damage to or disconnection of the drain channel 135 from the lower chamber wall 110 of the retaining-ejecting mechanism 200. In an example embodiment, the at least one drain channel 135 is a large, smoothly shaped drain configured to transfer the concentrated cleaning medium from the pod 205 to the base 600 reservoir without limiting space for the dispensing mechanism 300 and/or trigger mechanism 400. The at least one drain channel 135 may be configured around the design of the dispensing mechanism 300 and/or trigger mechanism 400 by flowing the concentrated cleaning medium around the perimeter of the internal structure of the cover housing 100. In an example embodiment, the at least one drain channel 135 is configured as a U-shaped tubular flow channel around the dispensing pipette 325 and flow channel 315.

Figure 13:
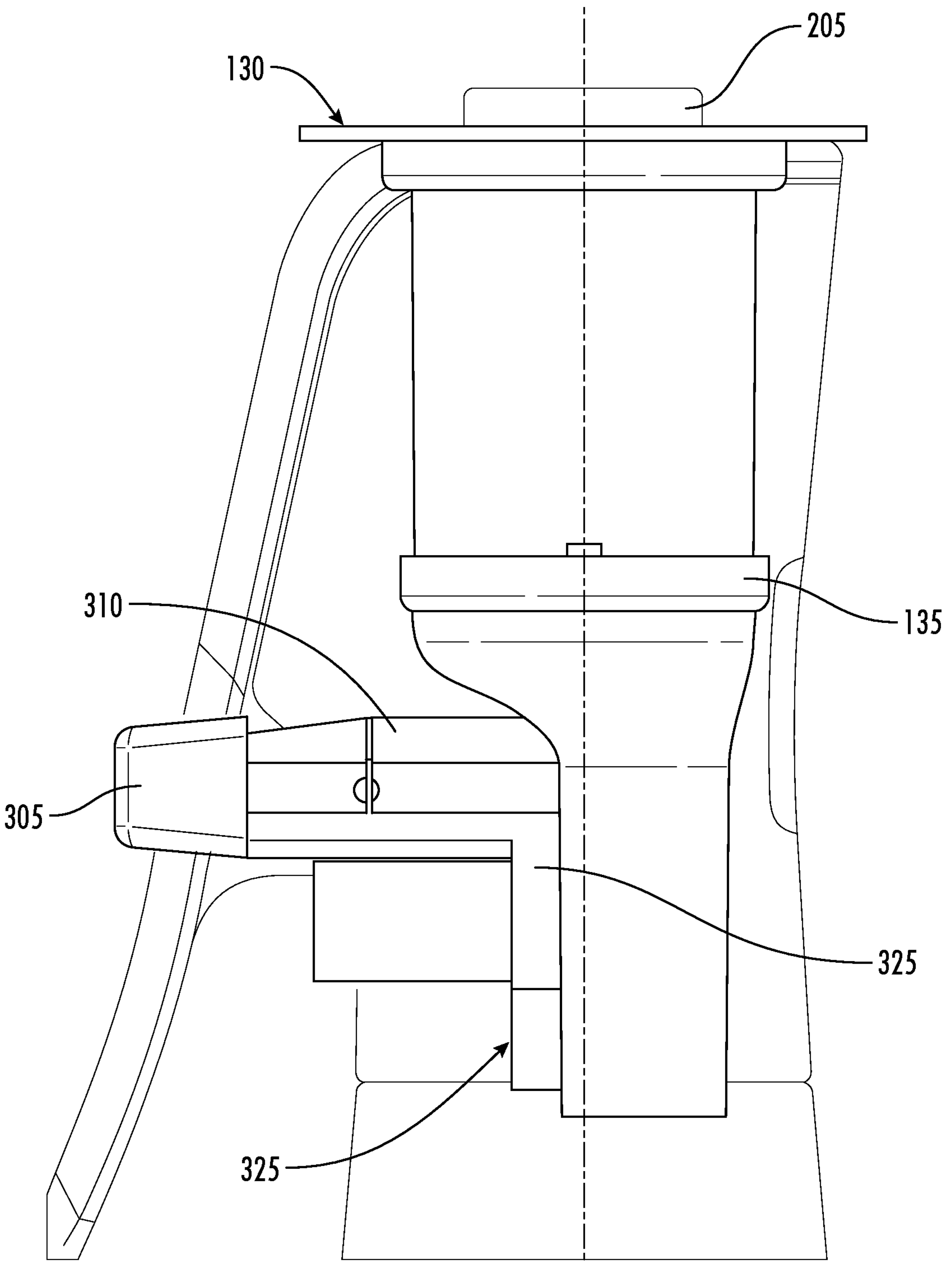
FIG. 13 illustrates a side view of the dispensing mechanism in accordance with example embodiments.

FIG. 13 provides a side view of the dispensing mechanism 300 and the trigger mechanism 400. FIG. 13 displays a silhouette of the dispenser 50 behind the dispensing mechanism 300 and the trigger mechanism 400 for representation of assembly. In an example embodiment, the atomization area 310 is smoothly formed, providing a natural flow of the cleaning solution from the base 600 reservoir to the nozzle 305 when actuated.

Figure 14:
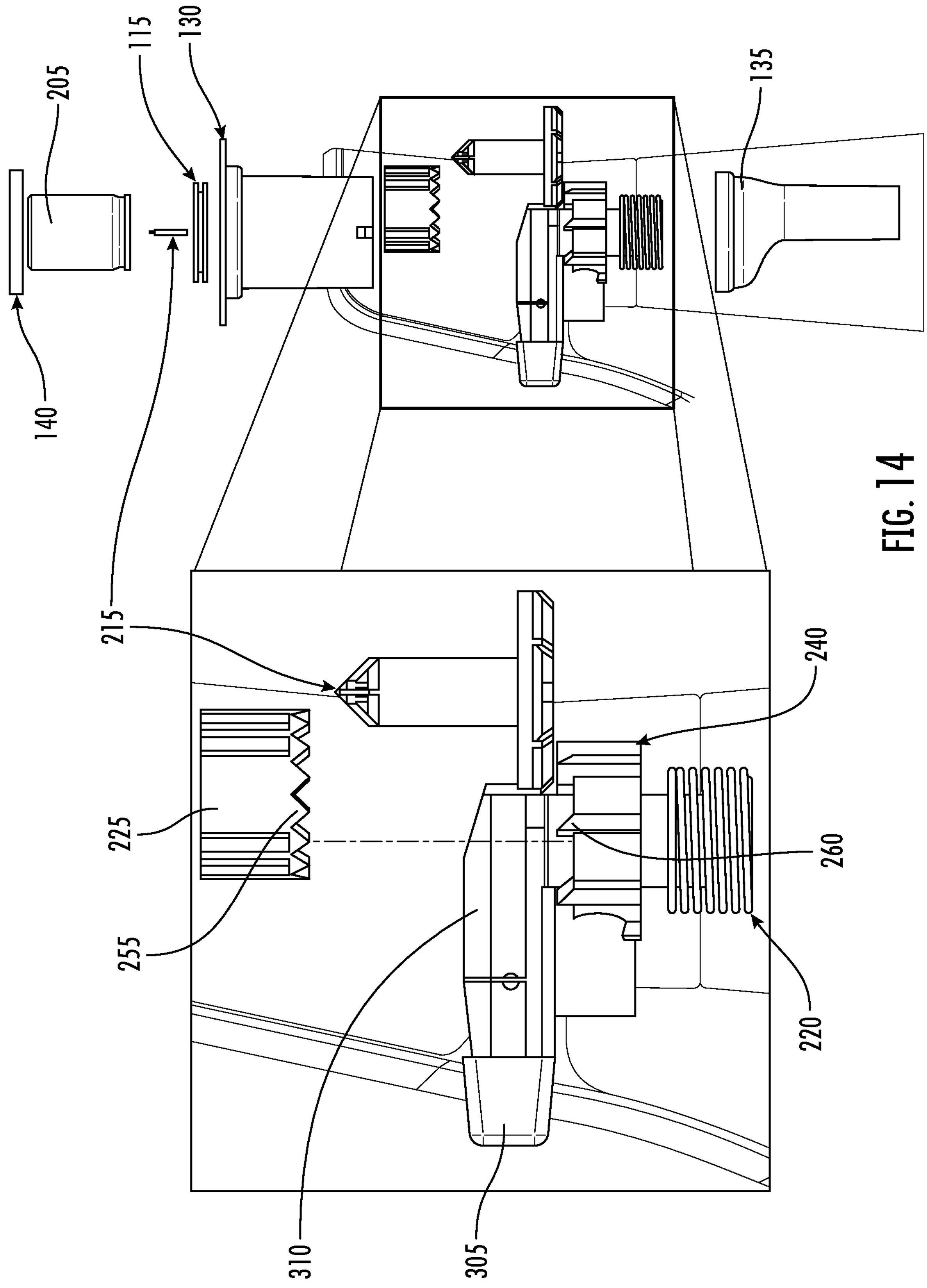
FIG. 14 illustrates an enlarged exploded side view of the dispensing in accordance with example embodiments.

FIG. 14 provides an enlarged exploded side view of the dispensing mechanism 300. In an example embodiment, the puncture tool 215 is a removable device. In an example embodiment, the puncture tool 215 may be configured as a consumable and/or wearable component requiring occasional replacement. In an example embodiment, the insert guide 225 is configured with a series of insert guide engagement teeth 255 at the bottommost surface of the insert guide 225. In an example embodiment, the spring retainer 240 is also configured with a series of spring retainer engagement teeth 260 at the upmost surface of the spring retainer 240. In an example embodiment, the puncture tool 215 is supported by a hollow puncture structure, providing way for the concentrated cleaning medium within the pod 205 to be released into the base 600 reservoir via the at least one drain channels 135.

Figure 15:
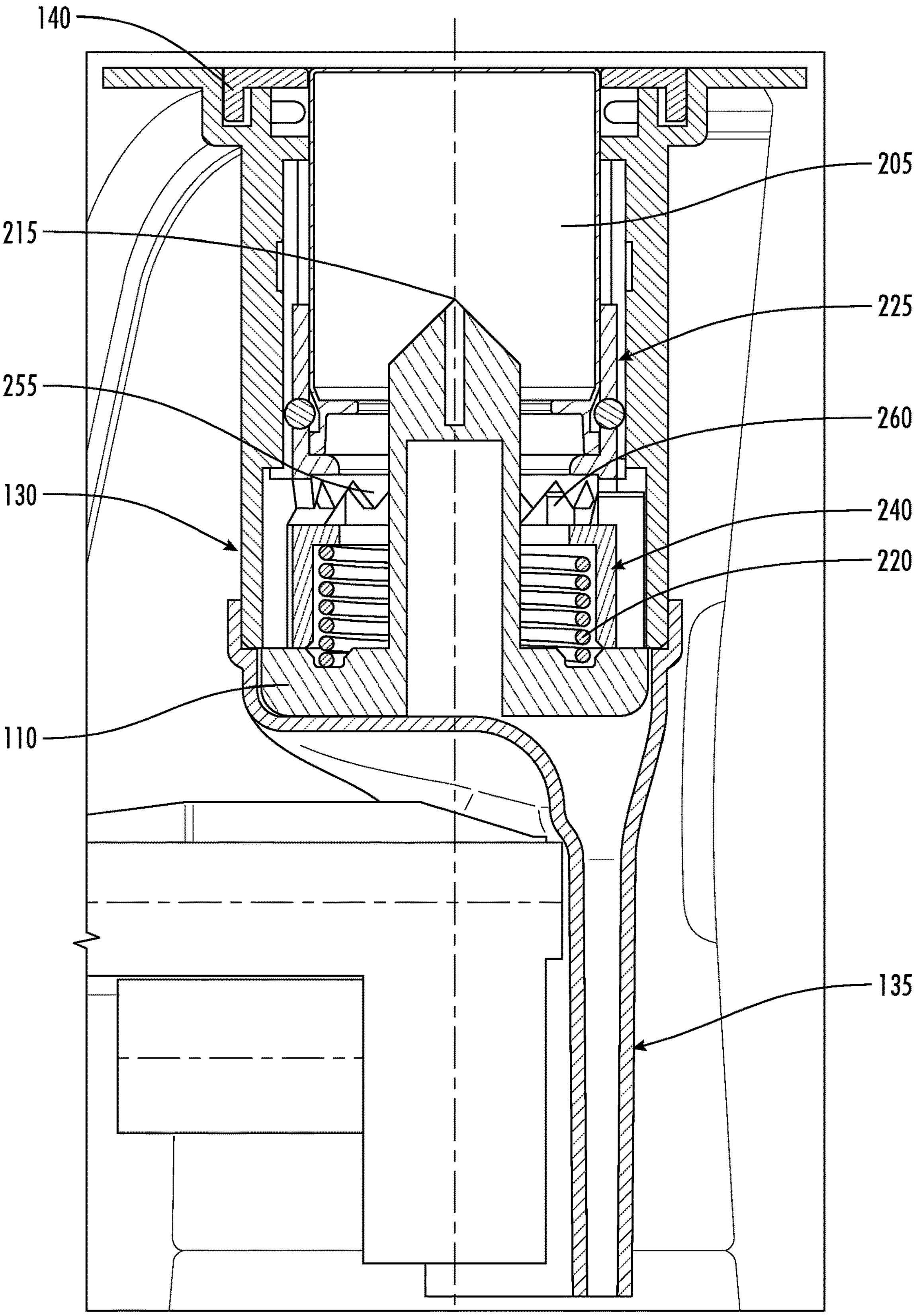
FIG. 15 illustrates a cross-sectional side view of the retaining-ejecting mechanism and the at least one drain channel in accordance with example embodiments.

FIG. 15 provides a cross-sectional side view of the retaining-ejecting mechanism 200 and the at least one drain channel 135. In an example embodiment, the insert guide 225 is configured with a series of insert guide engagement teeth 255 at the bottommost surface of the insert guide 225. In an example embodiment, the spring retainer 240 is also configured with a series of spring retainer engagement teeth 260 at the upmost surface of the spring retainer 240. In an example embodiment, when the pod 205 is retained within the retained position of the retaining-ejecting mechanism 200, the engagement teeth of the insert guide 225 and spring retainer 240 mechanically mesh, thus forcing the spring retainer 240 into a locked and/or retained orientation.

In various example embodiments, the insert guide engagement teeth 255 and spring retainer engagement teeth 260 are configured to mechanically mesh following the insertion of the pod 205 into the chamber 130. In an example embodiment, the retaining-ejecting mechanism 200 forces the insert guide 225 down onto the spring retainer 240 against the shared engagement surfaces 250. In an example embodiment, as the insert guide 225 is forced down onto the spring retainer 240, the meshed assembly (i.e., the joined insert guide 225 and spring retainer 240) is rotated a designated angle as a result of the interaction between the insert guide engagement teeth 255 and the spring retainer engagement teeth 260 to orient the cam 245 profile of the spring retainer 240 into a retained orientation. In an example embodiment, the spring 220 is held in a compressed orientation when the retaining-ejecting mechanism 200 is configured in the retained position. In an example embodiment, forcing the insert guide 225 down onto the spring retainer 240 against the shared engagement surfaces 250 again may release the spring 220 from the compressed orientation, forcing the insert guide 225 and pod 205 therein upward. For example, the rotation of the spring retainer 240 caused by the interaction of the insert guide engagement teeth 255 and the spring retainer engagement teeth 260 causes the spring retainer 240 to release the spring 220. In an example embodiment, following the cam 245 profile, the spring retainer 240 is rotated to its original orientation as the spring 220 compression is released.

Figure 16:
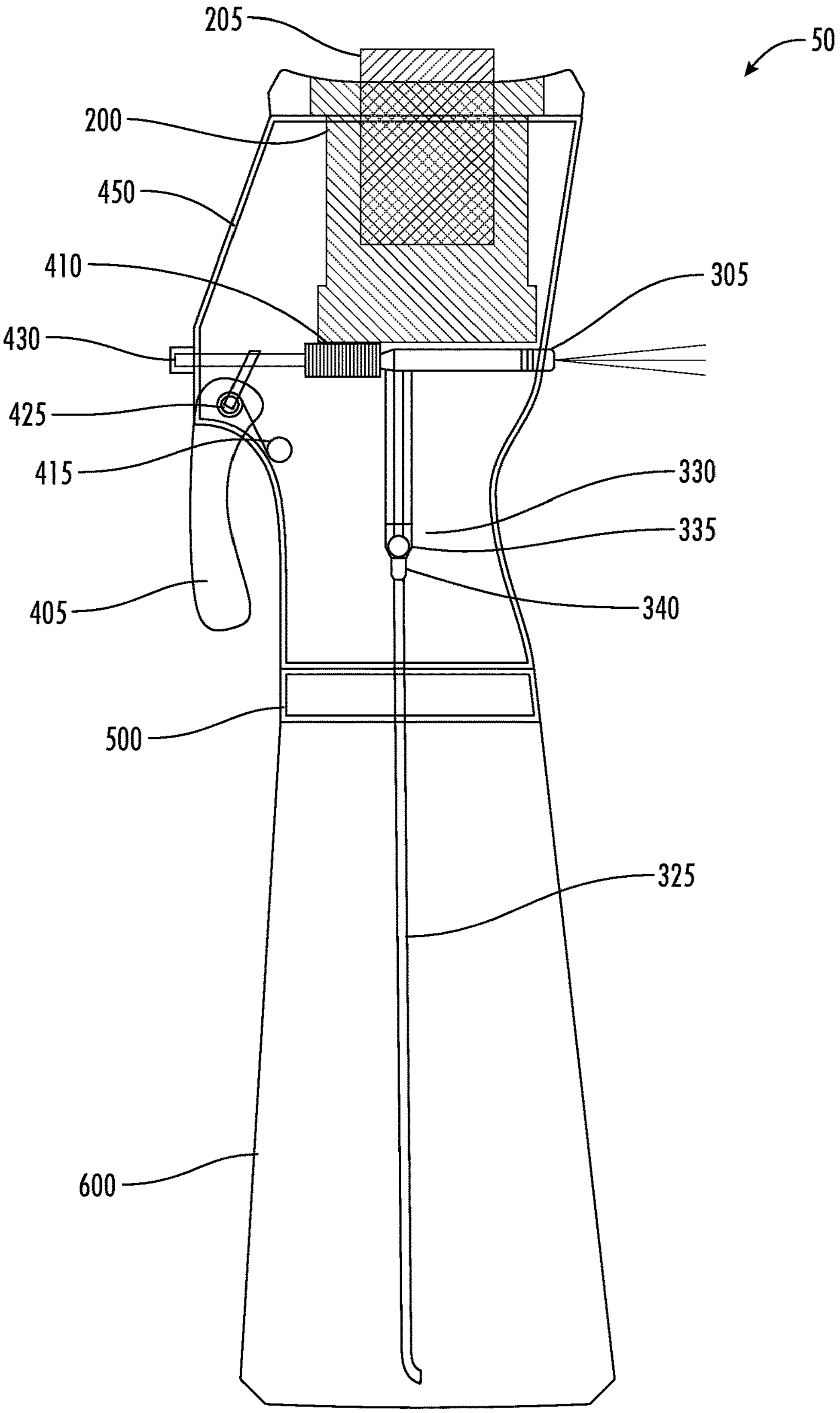
FIG. 16 illustrates a cross-sectional side view of a dispenser in accordance with an example embodiment.

FIG. 16 provides a cross-sectional side view of a dispenser 50. In an example embodiment, a pod 205 is inserted into a retaining-ejecting mechanism 200 located at the topmost region of the cover housing 450. In an example embodiment, the cover housing 450 is mechanically connected to the base 600 via an attachment mechanism 500. In an example embodiment, the attachment mechanism 500 is configured at least a portion of the body made from a clear and/or transparent material. In an example embodiment, the clear and/or transparent material is provided for viewing the fluid level in the base 600 reservoir. In an example embodiment, the dispenser is configured as an atomizer. In an example embodiment, a dispensing mechanism 300 is provided to transport a cleaning solution from the base 600 reservoir through a bead housing 330 and out of a nozzle 305. In an example embodiment, the bead housing 330 comprises a valve bead 335 for diverting the cleaning solution and a pipette retainer 340 to maintain the position of the dispensing pipette 325.

In various example embodiments, the trigger mechanism 400 is configured with a trigger pivot point 425, allowing actuation of the trigger handle 405. In an example embodiment, the trigger handle 405 is tensioned about the trigger pivot point 425 via a trigger spring 415. In an example embodiment, a trigger tensioner 430 is incorporated to adjustably configure the trigger spring 415 tension as desired for the individual user and/or use case. In an example embodiment, the trigger handle 405 is located on the opposing side from the nozzle 305. For example, in an example embodiment, the trigger handle 405 and the nozzle 305 are disposed on opposite sides of the cover housing 450 from one another. This configuration provides a rearward-facing trigger mechanism 400. In an example embodiment, the rearward-facing trigger mechanism 400 is intended for actuation via a user's thumb or palm. In various example embodiments, the actuation of the trigger mechanism 400 forces a plunger mechanism 410 to provide fluid pressure on the stored cleaning solution, thus transporting the fluid out of the holding area 320, into the atomization area 310, and out of the nozzle 305. In an example embodiment, when the trigger mechanism 400 is released, a vacuum transports fluid back into the holding area 320 for future use.

Example embodiments of the present invention provide cleaning pods for storing and providing concentrated cleaning mediums and a dispenser 50 for diluting and/or deconcentrating the concentrated cleaning mediums (e.g., to form a diluted and/or deconcentrated cleaning solution) and dispensing the diluted and/or deconcentrated cleaning solution. FIG. 1 and FIG. 2 show an example dispenser mechanism 300 that is an atomizer and example cleaning pod 205 within a dispenser 50 (e.g., atomizer 300, hand pump, and/or the like) to provide cleaning solution to the dispenser 50. The user may then use the diluted and/or deconcentrated cleaning solution. In an example embodiment, a pod 205 may be configured to contain approximately one cleaning session worth of cleaning mediums for mixing such that when the user is finished cleaning, the user need not store unused cleaning solution.

Example embodiments of the present invention provide an attachment mechanism 500 to attach the cover housing 100 to the base 600. The attachment mechanism 500 may be designed to accommodate threads (e.g., twisted and/or screwed) onto and/or into the design of the cover housing 100 and/or base. In an example embodiment, the attachment mechanism 500 is configured as part of the design of the cover housing 100. In an example embodiment, the attachment mechanism 500 is configured as part of the design of the base 600. In an example embodiment, the attachment mechanism 500 is configured independently from either the design of the cover housing 100 and/or the design of the base 600 to operate as a singular mechanism configured to attach the cover housing 100 to the base 600 without regard to the design of the cover housing 100 and/or the design of the base 600.

Example embodiments of the present invention also provide an insert guide 225 for the cleaning pod 205. The insert guide 225 provides a guided unidirectional translation of the pod 205 when inserted into or removed from the chamber 130. A plurality of positions is known and the insert guide 225 is designed to accommodate the aforementioned positions. At least one insert guide stop marker 235 may be integrated in the design of the insert guide 225 to achieve the positioning of the known positions. A clip 125 may be placed in one or more of the at least one insert guide stop markers 235 to hold a desired position of the insert guide 225. A retainer 120 may also be incorporated to retain the clip 125 within the bounds of the at least one insert guide stop marker 235 to prevent undesired and/or unintentional movement of the insert guide 235. In this example embodiment, the insert guide 225 provides the means of the retaining-ejecting mechanism 200. In an example embodiment, the fluid seal 115 also enables the cleaning pod 205 to maintain position within the retaining-ejecting mechanism 200 due to the friction fit within the bounds of the fluid seal 115.

In an example embodiment, the pod 205 is configured to contain 0.5 to 2 ounces of the concentrated cleaning medium. In an example embodiment, the pod 205 is configured to contain 0.25 to 1.25 ounces of concentrated cleaning medium (e.g., 0.5 to 1 ounce). In an example embodiment, the pod 205 is configured to contain 1.5 to 3 ounces of the concentrated cleaning medium. In an example embodiment, the pod 205 is configured to contain 1-2 ounces of the concentrated cleaning medium. In an example embodiment, the reservoir portion has a convex end surface configured to direct the diluted and/or deconcentrated cleaning solution toward a mouth of the dispensing pipette. In an example embodiment, the mouth of the dispensing pipette extends from the center of the cover housing 100 into the center of the base. In an example embodiment, the base comprises a metal or other resilient material such as glass, wood, plastic, rubber, and/or the like. In an example embodiment, the reservoir portion has a capacity of 10-30 ounces. In an example embodiment, the reservoir portion has a capacity of 5 to 15 ounces. In an example embodiment, the reservoir portion has a capacity of 20 to 40 ounces.

According to another aspect of the present invention, a pod 205 is provided. In an example embodiment, a pod 205 comprises a cup portion and a puncture membrane portion. The puncture membrane portion is configured to seal concentrated cleaning medium within the cup portion. The pod 205 may be configured to be secured within a retaining-ejecting mechanism 200 of the pod 205 chamber.

In example embodiments, the pod 205 is configured to contain 1-2 ounces of the concentrated cleaning medium. In an example embodiment, the pod 205 is configured to contain 0.5 to 2 ounces of the concentrated cleaning medium. In an example embodiment, the pod 205 is configured to contain 1.5 to 3 ounces of the concentrated cleaning medium. In an example embodiment, at least a portion of the pod 205 comprises metal. In various embodiments, the pod 205 may be comprised of a natural post recycled material, rubber, aluminum, plastic, cardboard, paper, etc. The shape of the pod 205 may be round/spherical, cubic, ovoid, polyhedron (e.g., a tetrahedron, pyramid, cuboid, rectangular cuboid, etc.), and/or the like, as appropriate for the application.

According to yet another aspect of the present invention, a method of dispensing a cleaning solution from a pod 205 is provided. In an example embodiment, the method comprises providing a dispenser 50. The dispenser 50 comprises a cover housing 100 comprising a pod 205 chamber 130 configured to receive a pod 205 containing concentrated cleaning medium therein, a base, and a dispensing mechanism 300 extending from the nozzle into a reservoir portion of the base. The cover housing 100 comprises a retaining-ejecting mechanism 200 which enables the pod 205 to be inserted into a retained position at least partially within the recess, retained in the retained position, and released from the retained position following designated user input, drain channel 135, a dispensing mechanism 300, a trigger mechanism 400, an attachment mechanism 500, and the pod 205 chamber 130. The base 600 comprises a reservoir portion configured for receiving the concentrated cleaning medium from the pod 205, for example, via the drain channel 135. The method further comprises diluting the concentrated cleaning medium with a dilution chemical in the reservoir portion to form a diluted and/or deconcentrated cleaning solution and activating the trigger handle 405. Activating the trigger handle 405 causes diluted and/or deconcentrated cleaning solution (e.g., a mixture of concentrated cleaning solution and dilution chemical) to be dispensed from the reservoir portion, through the dispensing pipette 325, and out of the nozzle 305.

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A dispenser comprising:

a cover housing comprising:

a chamber comprising:

a recess configured for receiving a pod at least partially therein, and a retaining-ejecting mechanism, the retaining-ejecting mechanism comprising:

at least one seal, wherein the at least one seal is configured to engage the pod to prevent mediums from at least one of the pod or a base to exit the dispenser undesirably and to retain the pod at least partially within the recess, and an insert guide configured to assist translation of the inserted pod along a unidirectional path in or out of the chamber, wherein the retaining-ejecting mechanism enables the pod to be inserted into a retained position at least partially within the recess, retained in the retained position, and released from the retained position;

a dispensing mechanism configured for selectively dispensing fluid from a reservoir of the dispenser; and the base at least partially defining the reservoir configured for receiving and maintaining the fluid therein, wherein the cover housing is configured to be coupled to the base so as to enclose the reservoir.

2. The dispenser according to claim 1, wherein the pod containing a concentrated cleaning medium is punctured via at least one puncture tool when inserted into the retained position of the retaining-ejecting mechanism, wherein the at least one puncture tool is a needle and/or a sharp or blunt edge tubular device.

3. The dispenser according to claim 2, wherein the puncturing of the pod releases the contained concentrated cleaning medium into the base via at least one drain channel.

4. The dispenser according to claim 3, wherein the released concentrated cleaning medium is deconcentrated and/or diluted into a cleaning solution when infused with the fluid contained within the base.

5. The dispenser according to claim 4, wherein the dispensing mechanism provides a means to expel the cleaning solution from the base via at least one dispensing pipette.

6. The dispenser according to claim 5, wherein the dispenser is an atomizer.

7. The dispenser according to claim 6, wherein the dispenser comprises a nozzle that is adjustable to accommodate a desired level of projection of the dispensed cleaning solution to a cleaning surface.

8. The dispenser according to claim 1, wherein the retaining-ejecting mechanism further comprises:

at least one spring, wherein the at least one spring applies a constant tension and/or compression force in a direction of the motion of the insert guide to provide resistance as the pod is translated through a plurality of positions.

9. The dispenser according to claim 1, wherein the at least one seal is a wipe seal, a bellows seal, or a plurality of seals in any combination thereof.

10. The dispenser according to claim 1, wherein:

an attachment mechanism to attach the cover housing to the base is configured as part of a design of the cover housing, the attachment mechanism to attach the cover housing to the base is configured as part of a design of the base, and/or the attachment mechanism to attach the cover housing to the base is configured independently from either the design of the cover housing and/or the design of the base to operate as a singular mechanism configured to attach the cover housing to the base without regard to the design of the cover housing and/or the design of the base.

11. The dispenser according to claim 10, wherein the attachment mechanism is threaded, push latch, snap-fit, and/or magnetic.

12. The dispenser according to claim 11, wherein the retaining-ejecting mechanism comprises at least one spring retainer, wherein the spring retainer is designed with a plurality of engagement teeth configured to:

rotate when first pressed downward in a unidirectional motion, lock within a feature of the insert guide, and release the spring force pressed downward a second time in the unidirectional motion.

13. The dispenser according to claim 12, wherein the dispenser comprises at least one drain channel that extends into the base.

14. The dispenser according to claim 13, wherein the dispenser comprises at least one dispensing pipette that extends into the base.

15. The dispenser of claim 1, wherein the retaining-ejecting mechanism defines at least a retained position and a released position.

16. A dispenser comprising:

a housing;

a nozzle coupled to a first side of the housing and configured to dispense fluid therethrough;

a trigger mechanism comprising:

a trigger handle disposed on a second side of the housing such that the trigger handle extends along a portion of the second side of the housing, a trigger pivot point, and a trigger spring; and a retaining-ejecting mechanism configured for receiving a pod therein, the retaining-ejecting mechanism comprising at least one seal, wherein the at least one seal is configured to engage the pod to prevent mediums from at least one of the pod or a base to exit the dispenser undesirably and to retain the pod at least partially within a recess of a chamber of the housing, and an insert guide configured to assist translation of the inserted pod along a unidirectional path between a retained position defined by the retaining-ejecting mechanism and a released positioned defined by the retaining-ejecting mechanism, wherein the retaining-ejecting mechanism enables the pod to be inserted into a retained position, retained in the retained position, and released from the retained position;

wherein the first side of the housing and the second side of the housing are opposite sides of the housing.

17. The trigger mechanism according to claim 16, further comprising a plunger mechanism, wherein the plunger mechanism is configured to:

force a cleaning solution from the base coupled to the housing into a holding area upon release of the trigger handle, and force the cleaning solution from the holding area, through an atomization area, and out of the nozzle upon activation of the trigger handle.

18. The trigger mechanism according to claim 16, wherein the trigger spring is adjustable via a trigger tensioner to accommodate a desired level of tension against the trigger handle in a direction opposing actuation.

19. A method for dispensing a predefined volume of a cleaning solution, the method comprising:

providing a dispenser, the dispenser comprising:

a cover housing comprising:

a chamber comprising:

a recess configured for receiving a pod at least partially therein, and a retaining-ejecting mechanism, the retaining-ejecting mechanism comprising an insert guide configured to assist translation of the inserted pod along a unidirectional path in or out of the chamber, wherein the retaining-ejecting mechanism enables the pod to be inserted into a retained position at least partially within the recess, retained in the retained position, and released from the retained position; and a dispensing mechanism configured for selectively dispensing fluid from a reservoir of the dispenser; and a base at least partially defining the reservoir configured for receiving and maintaining the fluid therein, wherein the cover housing is configured to be coupled to the base so as to enclose the reservoir;

providing a trigger mechanism, the trigger mechanism comprising:

a trigger handle, a trigger pivot point, a trigger spring, and a plunger mechanism, wherein the plunger mechanism is configured to:

force the cleaning solution from the base into a holding area upon release of the trigger handle, and force the cleaning solution from the holding area, through an atomization area, and out of a nozzle upon activation of the trigger handle;

inserting the pod containing a concentrated cleaning medium into the pod chamber of the dispenser;

pressing the pod into the retained position of the retaining-ejecting mechanism so as to retain the pod in the cover housing and release the concentrated cleaning medium from the pod;

shaking the dispenser to deconcentrate and/or dilute the concentrated cleaning medium with the contents of the base;

activate the trigger mechanism to dispense the deconcentrated and/or diluted cleaning solution from the base;

remove and properly dispose of the pod; and store the dispenser for next use.

20. The method according to claim 19, wherein the predefined volume of the cleaning solution is configured for single use operation.

* * * * *